(12) United States Patent
Rosales et al.

(10) Patent No.: US 12,288,112 B2
(45) Date of Patent: Apr. 29, 2025

(54) HIGH-CONTRAST ELECTRICAL CONNECTOR WITH MACHINE READABLE INDICIA

(71) Applicant: Aptiv Technologies AG, Schaffhausen (CH)

(72) Inventors: Luis Alonso Rosales, Saltillo (MX); Maximiliano Murillo Villarreal, Arteaga (MX); Luis Ignacio Castillo Esquivel, Saltillo (MX); Daniel Calvillo, Ramos Arizpe (MX)

(73) Assignee: Aptiv Technologies AG, Schaffhausen (CH)

( * ) Notice: Subject to any disclaimer, the term of this patent is extended or adjusted under 35 U.S.C. 154(b) by 0 days.

(21) Appl. No.: 18/776,738

(22) Filed: Jul. 18, 2024

(65) Prior Publication Data

US 2025/0028921 A1    Jan. 23, 2025

Related U.S. Application Data

(60) Provisional application No. 63/543,367, filed on Oct. 10, 2023, provisional application No. 63/527,854, filed on Jul. 20, 2023.

(51) Int. Cl.
*G06K 19/06*    (2006.01)

(52) U.S. Cl.
CPC .............................. *G06K 19/06037* (2013.01)

(58) Field of Classification Search
CPC .. G06K 7/1404; G06K 7/1417; G06K 7/1439; G06K 7/1443; G06K 19/06037
See application file for complete search history.

(56) References Cited

U.S. PATENT DOCUMENTS

| 2007/0125870 A1 | 6/2007 | Edwards et al. |
| 2023/0024113 A1 | 1/2023 | Larson |
| 2024/0380167 A1* | 11/2024 | Nozaki ................ H01R 13/465 |

FOREIGN PATENT DOCUMENTS

WO    2023047965 A1    3/2023

OTHER PUBLICATIONS

"Extended European Search Report"; European Patent Office; mailed on Dec. 20, 2024; 10 pages.

* cited by examiner

*Primary Examiner* — Laura A Gudorf
(74) *Attorney, Agent, or Firm* — Billion & Armitage

(57) ABSTRACT

The present disclosure presents an electrical connector comprising a connector housing with machine-readable indicia printed on its surface. The indicia is bordered by a darker background on the surface, ensuring ample contrast for accurate reading by a digital scanner. This innovative design enhances the readability and reliability of the indicia, facilitating efficient data capture and identification processes.

15 Claims, 2 Drawing Sheets

HIGH-CONTRAST ELECTRICAL CONNECTOR WITH MACHINE READABLE INDICIA

CROSS-REFERENCE TO RELATED APPLICATIONS

This application claims the benefit of and priority to U.S. Provisional Application 63/543,367, titled "Marking Indicia with Contrasting Background", filed Oct. 10, 2023, and further claims the benefit of and priority to U.S. Provisional Application 63/527,854, titled "Blacked Out Laser Mark for Contrast", filed Jul. 20, 2023, the contents of each of which are incorporated by reference herein.

TECHNICAL FIELD OF THE INVENTION

This disclosure is directed to a method of marking a device, such as an electrical connector, which may be one of several acceptable shades/tints of a color so that the marking is legible to a digital scanner regardless of the shade/tint of the color selected.

BACKGROUND

High voltage electrical connectors are typically formed from an orange colored material, such as an orange plastic resin. There are multiple acceptable hues, tints, and shades of orange that are approved by automotive manufacturers for the housings of the high voltage electrical connectors. This creates a variation in contrast between different orange colored connector and the identifying markings, e.g., 2D bar codes, on the connector. This variability in contrast makes it difficult to program many of the less sophisticated and/or lower cost digital bar code readers to accurately read markings on all of the acceptably orange colored connectors. This prohibits automotive manufacturers from reliably using digitally readable markings on the electrical connectors unless using more expensive digital code readers capable of resolving a wider range of contrast between the marking and the background.

Previous approaches to labeling electrical connectors have typically involved using adhesive labels or embossed markings on the surface of the connector housing. These methods have presented challenges in terms of durability, legibility, and ease of scanning for automated systems. Adhesive labels can peel off over time, especially in harsh environments, while embossed markings may not provide enough contrast for accurate scanning by digital scanners. Additionally, embossed markings can be difficult to read in low light conditions or from certain angles, leading to potential errors in scanning and data retrieval.

In some cases, connectors have been labeled using laser etching or engraving techniques to create machine-readable indicia. While these methods can provide a more permanent solution compared to adhesive labels, they may still lack the necessary contrast between the indicia and the surface of the connector housing. This lack of contrast can result in inaccuracies during scanning, particularly when the connector is located in a dimly lit area or when the scanner is at an angle to the surface. As a result, there remains a need for an improved labeling solution for electrical connectors that ensures accurate and reliable scanning of machine-readable indicia under various lighting and viewing conditions.

Furthermore, attempts have been made to enhance the visibility and readability of indicia on electrical connectors by using color contrast between the indicia and the surface. However, achieving the optimal level of contrast to enable accurate scanning by digital scanners has proven to be a challenge. Inadequate contrast can lead to misinterpretation of the encoded information, potentially causing errors in data transmission or retrieval. Therefore, there is a continued demand for an electrical connector labeling solution that effectively addresses the contrast requirements for machine-readable indicia, ensuring reliable and efficient data capture. However, none of these approaches have provided a comprehensive solution that combines the features described in this disclosure.

SUMMARY

In some aspects, the techniques described herein relate to an electrical connector, including a connector housing, machine readable indicia printed on a surface of the connector housing, and a background printed on the surface bordering the indicia. The background is darker than the indicia and provides sufficient contrast between the surface and the indicia to allow a digital scanner to accurately read the indicia.

In some aspects, the techniques described herein relate to a method of marking a product, including printing a background onto a surface of a product using a laser printing method and printing machine readable indicia onto the background using the laser printing method such that the background borders the indicia. The background is darker than the indicia and provides sufficient contrast between the surface and the indicia to allow a digital scanner to accurately read the indicia.

In some aspects, the techniques described herein relate to a printing apparatus, including a laser configured to form a marking a surface of a product, an electronic controller configured to control operation of the laser, a computer readable non-transitory storage medium in communication with the electronic controller and having data stored therein representing software executable by the electronic controller including instructions to: print a background onto the surface using the laser, print machine readable indicia onto the background using the laser such that the background borders the indicia, and print the background to be darker than the indicia, thereby providing sufficient contrast between the surface and the indicia to allow a digital scanner to accurately read the indicia.

DETAILED DESCRIPTION

Figure 1:
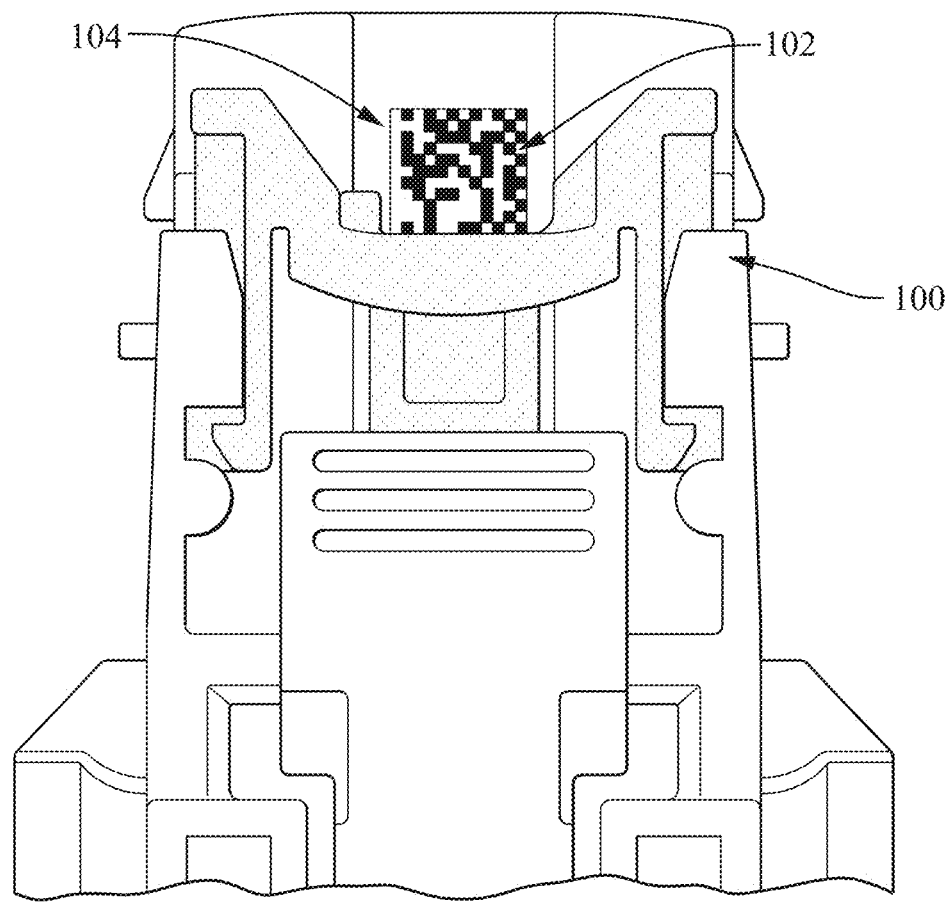
FIG. 1 illustrates indicia printed onto a products having a background bordering the indicia according to some embodiments.

FIG. 1 illustrates a non-limiting example of a connector housing 100 of an electrical connector formed of a material having an orange shade having indicia 102, such as a 2D bar code, printed onto a surface of the connector housing 100, preferably by a laser printing machine, Due to a background 104 printed around and bordering the indicia 102 is legible to a digital scanner or code reader regardless of the shades of the connector housing 100 according to some embodiments of the invention.

According to the non-limiting example shown in FIG. 1, an electrical connector includes the connector housing 100, machine readable indicia 102 printed on a surface of the connector housing 100, and a background 104 printed on the surface bordering the indicia 102. The background 104 is darker than the indicia 102, thereby providing sufficient contrast between the surface of the connector housing 100 and the indicia 102 to allow a digital scanner to accurately read the indicia 102. The background 104 may preferably be a black color. The background 104 preferably surrounds the indicia 102 to provide consistent contrast for the indicia 102. The indicia 102 may be a bar code, such as a 2D bar code. The 2D bar code may conform to an established standard, such as International Standards Organization/International Electrotechnical Commission (ISO/IEC) 15438, ISO/IEC 16022, ISO/IEC 24778, or ISO/IEC 18004 standards. A contrast ratio between the indicia 102 and the background 104 may be at least 20%. The surface of the connector housing 100 on which the indicia 102 and the background 104 are printed may have an orange color which includes tints and shades of a color having a wavelength between 585-620 nanometers.

Figure 2:
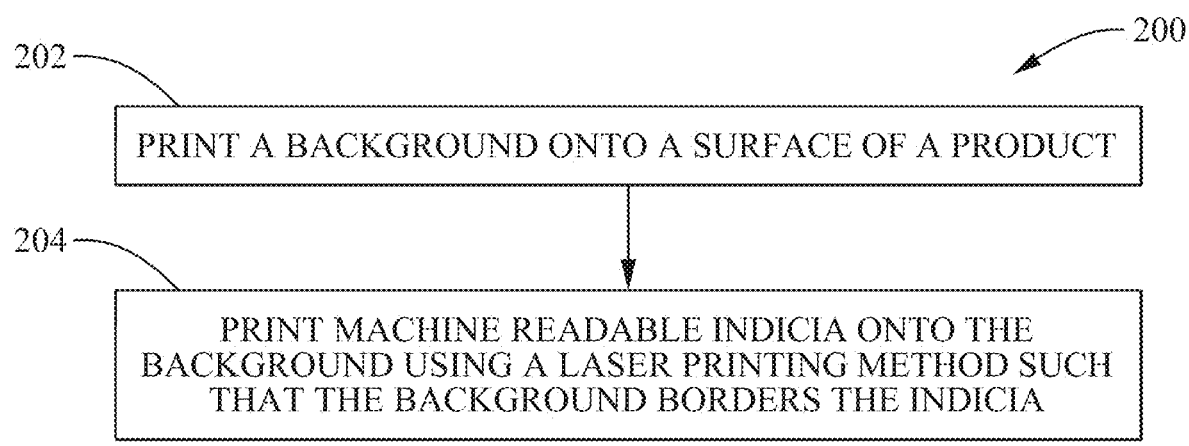
FIG. 2 illustrates a flow chart of a method and process of marking a product according to some embodiments.

A non-limiting example of a method 200 of marking a product, such as an electrical connector, is shown in FIG. 2. The method 200 includes the STEP 202 of printing a background 104 onto a surface of a product, such as a connector housing 100, using a laser printing method and the STEP 204 of printing machine readable indicia 102 onto the background 104 using the laser printing method such that the background 104 borders and preferably surrounds, the indicia 102. The background 104 is darker than the indicia 102 and is preferably black, thereby providing sufficient contrast between the surface of the product and the indicia 102 to allow a digital scanner to accurately read the indicia 102. The indicia 102 may be a bar code, such as a 2D bar code. The 2D bar code may conform to an established standard, such as International Standards Organization/International Electrotechnical Commission (ISO/IEC) 15438, ISO/IEC 16022, ISO/IEC 24778, or ISO/IEC 18004 standards. A contrast ratio between the indicia 102 and the background 104 may be at least 20%. The surface on which the indicia 102 and the background 104 are printed may have an orange color which includes tints and shades of a color having a wavelength between 585-620 nanometers.

A non-limiting example of a product, such as connector housing 100 shown in FIG. 1, is formed by a process such as the method 200 shown in FIG. 2 that includes the STEP 202 of printing a background 104 onto a surface of the product, such as a connector housing 100, using a laser printing method and the STEP 204 of printing machine readable indicia 102 onto the background 104 using a laser printing method such that the background 104 borders and preferably surrounds, the indicia 102. The background 104 is darker than the indicia 102, thereby providing sufficient contrast between the surface of the product and the indicia 102 to allow a digital scanner to accurately read the indicia 102. The indicia 102 may be a bar code, such as a 2D bar code. The 2D bar code may conform to an established standard, such as International Standards Organization/International Electrotechnical Commission (ISO/IEC) 15438, ISO/IEC 16022, ISO/IEC 24778, or ISO/IEC 18004 standards. A contrast ratio between the indicia 102 and the background 104 may be at least 20%. The surface on which the indicia 102 and the background 104 are printed may have an orange color which includes tints and shades of a color having a wavelength between 585-620 nanometers.

While the method 200 of forming the indicia 102 and background 104 descried herein are performed using a laser printing method, alternative embodiments may be envisioned in which the indicia 102 and the background 104 are formed using other printing methods, e.g., pad printing, screen printing, etc.

Figure 3:
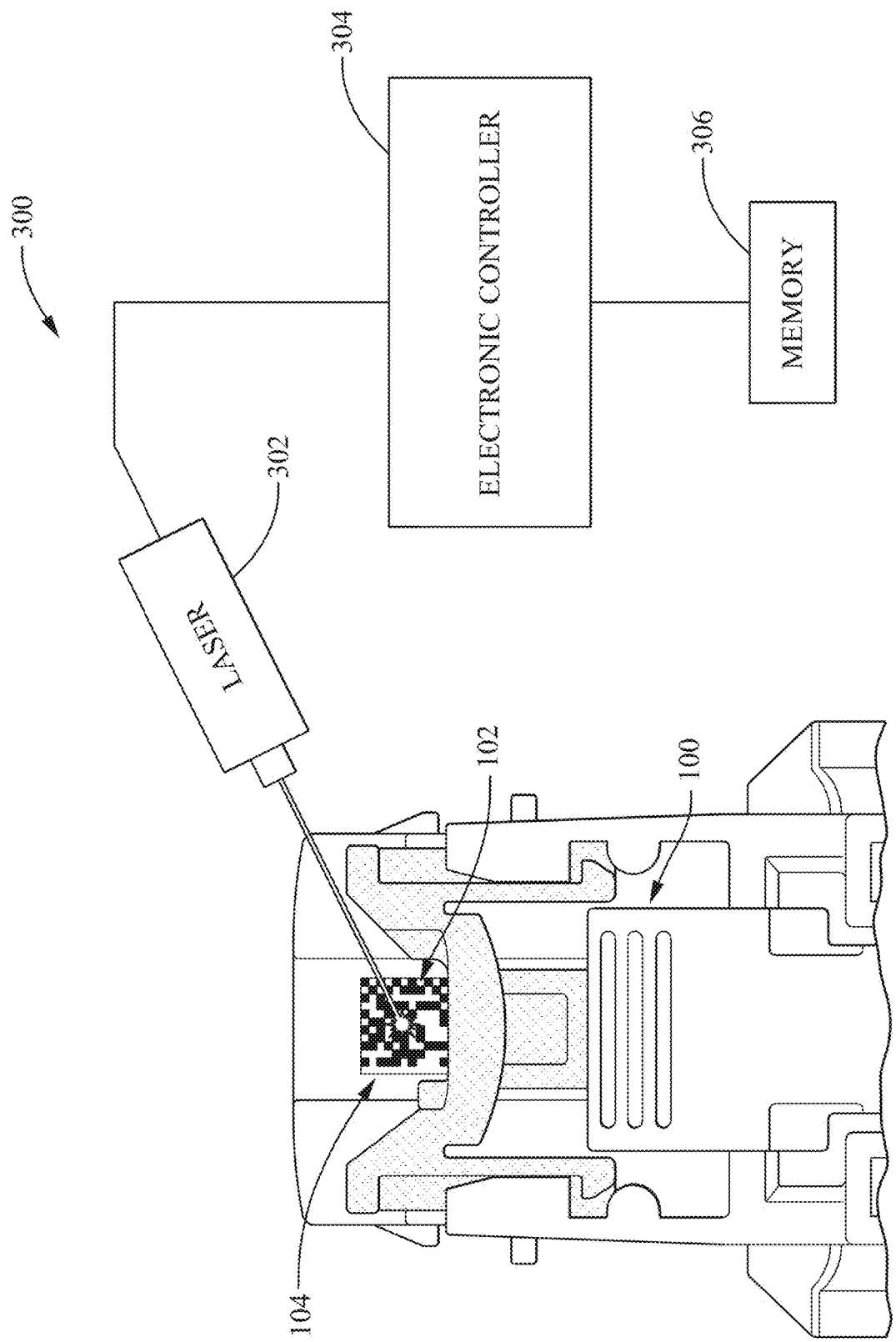
FIG. 3 illustrates a schematic diagram of a printing apparatus according to some embodiments.

A non-limiting example of a laser printing apparatus 300 is shown in FIG. 3. The apparatus 300 includes a laser 302 that is configured to form a marking in the form on an indicia 102 and a background 104 a surface of a product, such as the connector housing 100 and an electronic controller 304 that is configured to control operation of the laser 302. A computer readable non-transitory storage medium (memory 306) is in communication with the electronic controller 304 and contains data stored therein representing software that executable is by the electronic controller 304. The software includes instructions that cause the laser printing apparatus 300 to print a background 104 onto the surface of the connector housing 100 using the laser 302 and print machine readable indicia 102 onto the background 104 using the laser 302 such that the background 104 borders the indicia 102. The software includes instructions that cause laser 302 to print the background 104 to be darker than the indicia 102, thereby providing sufficient contrast between the surface of the connector housing 100 and the indicia 102 to allow a digital scanner to accurately read the indicia 102. The software may further include instructions to print the indicia 102 such that the background 104 surrounds the indicia 102. The software may further include instructions to print the indicia 102 as a bar code, such as a 2D bar code. The 2D bar code may conform to an established standard, such as International Standards Organization/International Electrotechnical Commission (ISO/IEC) 15438, ISO/IEC 16022, ISO/IEC 24778, or ISO/IEC 18004 standards. A contrast ratio between the indicia and the background may be at least 20%.

The products, methods, and apparatus presented herein provide the benefits of:
- Eliminating the need to use higher cost bar code readers due to a consistent contrast between the indicia 102 and the background 104.
- Eliminating the need to use ink print technology to form the indicia 102 on the connector housing 100.
- Providing proper contrast for the indicia 102 by the background 104 regardless of the shade of the material used for the forming the connector housing 100.
- Preventing material waste and raw material rework because the shade of the material used to form the connector housing 100 does not need to be carefully controlled to provide proper contrast for the indicia 102.
- Eliminating the need for the manufacturing facility to adjust bar code reader contrast due to different color shades of the connector housing 100.

While the example embodiments provided herein are directed to high voltage electrical connectors, other embodiments may be envisioned in which the methods described are used to mark many other types of products having different colored surfaces.

Discussion of Possible Embodiments

The following are non-exclusive descriptions of possible embodiments of the present invention.

In some aspects, the techniques described herein relate to an electrical connector, including a connector housing, machine readable indicia printed on a surface of the connector housing, and a background printed on the surface bordering the indicia, the background being darker than the indicia and providing sufficient contrast between the surface and the indicia to allow a digital scanner to accurately read the indicia.

The connector of the preceding paragraph can optionally include, additionally and/or alternatively any, one or more of the following features/steps, configurations and/or additional components.

In some aspects, the techniques described herein relate to an electrical connector, wherein the background surrounds the indicia.

In some aspects, the techniques described herein relate to an electrical connector, wherein the indicia is a bar code.

In some aspects, the techniques described herein relate to an electrical connector, wherein the indicia is a 2D bar code.

In some aspects, the techniques described herein relate to an electrical connector, wherein a contrast ratio between the indicia and the background is at least 20%.

In some aspects, the techniques described herein relate to an electrical connector, wherein the surface has an orange color.

In some aspects, the techniques described herein relate to a method of marking a product, including: printing a background onto a surface of a product using a laser printing method and printing machine readable indicia onto the background using the laser printing method such that the background borders the indicia, the background being darker than the indicia and providing sufficient contrast between the surface and the indicia to allow a digital scanner to accurately read the indicia.

The method of the preceding paragraph can optionally include, additionally and/or alternatively any, one or more of the following features/steps, configurations and/or additional components.

In some aspects, the techniques described herein relate to a method, wherein the indicia is printed onto the background such that the background surrounds the indicia.

In some aspects, the techniques described herein relate to a method, wherein the indicia is a bar code.

In some aspects, the techniques described herein relate to a method, wherein the indicia is a 2D bar code.

In some aspects, the techniques described herein relate to a method, wherein a contrast ratio between the indicia and the background is at least 20%.

In some aspects, the techniques described herein relate to a method, wherein the surface has an orange color.

In some aspects, the techniques described herein relate to a method, wherein the product is an electrical connector.

In some aspects, the techniques described herein relate to a printing apparatus, including: a laser configured to form a marking a surface of a product, an electronic controller configured to control operation of the laser, a computer readable non-transitory storage medium in communication with the electronic controller and having data stored therein representing software executable by the electronic controller including instructions to: print a background onto the surface using the laser, print machine readable indicia onto the background using the laser such that the background borders the indicia, and print the background to be darker than the indicia, thereby providing sufficient contrast between the surface and the indicia to allow a digital scanner to accurately read the indicia.

The apparatus of the preceding paragraph can optionally include, additionally and/or alternatively any, one or more of the following features/steps, configurations and/or additional components.

In some aspects, the techniques described herein relate to a printing apparatus, wherein the software includes instructions to print the indicia such that the background surrounds the indicia.

In some aspects, the techniques described herein relate to a printing apparatus, wherein the software includes instructions to print the indicia as a bar code.

In some aspects, the techniques described herein relate to a printing apparatus, wherein the indicia is a 2D bar code.

In some aspects, the techniques described herein relate to a printing apparatus, wherein the software includes instructions to print the indicia such that a contrast ratio between the indicia and the background is at least 20%.

While the invention has been described with reference to an exemplary embodiment(s), it will be understood by those skilled in the art that various changes may be made, and equivalents may be substituted for elements thereof without departing from the scope of the invention. In addition, many modifications may be made to adapt a particular situation or material to the teachings of the invention without departing from the essential scope thereof. Therefore, it is intended that the invention is not limited to the disclosed embodiment(s), but that the invention will include all embodiments falling within the scope of the appended claims.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Additionally, while terms of ordinance or orientation may be used herein these elements should not be limited by these terms. All terms of ordinance or orientation, unless stated otherwise, are used for purposes distinguishing one element from another, and do not denote any particular order, order of operations, direction or orientation unless stated otherwise.

The invention claimed is:

1. An electrical connector, comprising:
a connector housing;
a machine readable two dimensional (2D) bar code conforming to an established standard printed on a surface of the connector housing; and
a background printed on the surface bordering the 2D bar code, the background being darker than the 2D bar code and providing sufficient contrast between the surface and the 2D bar code to allow a digital scanner to accurately read the 2D bar code.

2. The electrical connector according to claim 1, wherein the background surrounds the 2D bar code.

3. The electrical connector according to claim 1, wherein the 2D bar code conforms to International Standards Organization/International Electrotechnical Commission (ISO/IEC) 15438, ISO/IEC 16022, ISO/IEC 24778, or ISO/IEC 18004 standards.

4. The electrical connector according to claim 1, wherein a contrast ratio between the 2D bar code and the background is at least 20%.

5. The electrical connector according to claim 1, wherein the surface has an orange color.

6. A method of marking a product, comprising:
printing a background onto a surface of a product using a laser printing method; and
printing a machine readable two dimensional (2D) bar code conforming to an established standard onto the background using the laser printing method such that the background borders the 2D bar code, the background being darker than the 2D bar code and providing sufficient contrast between the surface and the 2D bar code to allow a digital scanner to accurately read the 2D bar code.

7. The method according to claim 6, wherein the 2D bar code is printed onto the background such that the background surrounds the 2D bar code.

8. The method according to claim 6, wherein the 2D bar code conforms to International Standards Organization/International Electrotechnical Commission (ISO/IEC) 15438, ISO/IEC 16022, ISO/IEC 24778, or ISO/IEC 18004 standards.

9. The method according to claim 6, wherein a contrast ratio between the 2D bar code and the background is at least 20%.

10. The method according to claim 6, wherein the surface has an orange color.

11. The method according to claim 6, wherein the product is an electrical connector.

12. A printing apparatus, comprising:
a laser configured to form a marking on a surface of a product;
an electronic controller configured to control operation of the laser,
a computer readable non-transitory storage medium in communication with the electronic controller and having data stored therein representing software executable by the electronic controller including instructions to:
print a background onto the surface using the laser;
print a machine readable two dimensional (2D) bar code conforming to an established standard onto the background using the laser such that the background borders the 2D bar code; and
print the background to be darker than the 2D bar code, thereby providing sufficient contrast between the surface and the 2D bar code to allow a digital scanner to accurately read the 2D bar code.

13. The printing apparatus according to claim 12, wherein the software includes instructions to print the 2D bar code such that the background surrounds the 2D bar code.

14. The printing apparatus according to claim 12, wherein the software includes instructions to print the 2D bar code such that it conforms to International Standards Organization/International Electrotechnical Commission (ISO/IEC) 15438, ISO/IEC 16022, ISO/IEC 24778, or ISO/IEC 18004 standards.

15. The printing apparatus according to claim 12, wherein the software includes instructions to print the 2D bar code such that a contrast ratio between the 2D bar code and the background is at least 20%.

* * * * *